United States Patent [19]

Glicksman et al.

[11] 3,881,031

[45] Apr. 29, 1975

[54] METHOD OF PREVENTING GELATION IN CANNED GRAVY-BASED PET FOODS

[75] Inventors: Martin Glicksman, Valley Cottage; Elizabeth H. Farkas, Yonkers, both of N.Y.

[73] Assignee: General Foods Corporation, White Plains, N.Y.

[22] Filed: July 13, 1973

[21] Appl. No.: 379,034

[52] U.S. Cl. ................. 426/325; 426/321; 426/332
[51] Int. Cl. ............................................. A23l 1/04
[58] Field of Search .......... 426/203, 325, 332, 131, 426/133

[56] References Cited
UNITED STATES PATENTS

| | | | |
|---|---|---|---|
| 3,385,714 | 5/1968 | Smith | 426/131 |
| 3,454,405 | 7/1969 | Beach | 426/131 |
| 3,721,571 | 3/1973 | Glickman | 426/131 |

*Primary Examiner*—A. Louis Monacell
*Assistant Examiner*—J. M. Hunter
*Attorney, Agent, or Firm*—Daniel J. Donovan; Bruno P. Struzzi; Doris M. Bennett

[57] ABSTRACT

The formation of a gelled gravy in canned meat-containing products is prevented by the use of anionic polymers such as gum ghatti, gum arabic and xanthan which both inhibit protein extraction from the meat and prevent gelation in the extracted protein which may be present in sufficient amounts to form gels upon cooling and/or storage.

10 Claims, No Drawings

METHOD OF PREVENTING GELATION IN CANNED GRAVY-BASED PET FOODS

BACKGROUND OF THE INVENTION

The present invention relates to a method of preventing gelation of the gravy in canned meat-containing foodstuffs. Explicitly, the invention pertains to a method of gelation prevention whereby specific anionic polymers are added to the gravy base which polymers have been found to inhibit gelation of the gravy both by preventing the extraction of the protein from the meat and by preventing gel formation most probably by inhibiting the hydrogen bond formation between the polymers.

The development of canned meat spreads, ready-to-serve gravies, meat and gravy-type pet foods and the like has been the result of a long and continuous search among food technologists and pet food specialists to develop convenient-to-serve meat and meat-by-product-containing foodstuffs. Due principally to the method of processing coupled with the protein content of such products, problems have arisen with the tendency of the liquid portion of the canned foodstuff particularly gravies, to gel when stored at room temperature or below. Even in the case of "homemade" gravies prepared from the juices of the cooked meat, a familiar phenomenon is the gelation of the gravy on storage in the refrigerator. In all instances, this is due to the presence of protein having been extracted from the meat on "cooking." In the case of pet foods this problem is particularly apparent in the meat and gravy type products where it has been found that due to the sterilization procedure necessitating high temperatures, the protein in the meat, which is most often collagen or gelatin, derived from collagen is extracted from the meat into the gravy whereupon hydrogen bonding takes place and on cooling and storage results in cross linkages of the same and eventual gelation of the protein.

SUMMARY OF THE INVENTION

It has been found that the addition of ceramic anionic polymers to canned meat and gravy type products and the like prevents gelation of the gravy portion on storage. Specifically, when gum arabic, gum ghatti or a combination thereof are added to the gravy portion of the foodstuff, these polymers have been found to both appreciably inhibit the extraction of protein from the meat into the gravy when the mixture is subjected to high temperatures for reasons of sterilization etc. and prevent gel formation in the minimal amount of gel-forming protein that may become extracted.

The mechanism of this invention is not immediately understood but it has been determined that the ability of these polymers to prevent gelation is directly related to both the anionic properties of these compounds and the amount of extractable protein present in the system. Consequently, where certain anionic polymers may be effective at one range of protein content, they may be partially or completely ineffective at a higher range of the same. The gums of this invention have been found to be particularly effective where the protein content ranges from about 15 to about 35%. However, it is not wished to limit this invention to either this range of protein or to the gums which have been found to be effective therein since numerous other anionic polymers such as sodium carrageenate, xanthan gum, gum tragacanth, sodium alginate, gum karaya, and the like, though not significantly effective at the aforementioned protein range, would forseeably function at their maximum level of effectiveness where the range of protein is appreciably varied. Similarly, it is not wished to restrict this invention to the confines of a meat and gravy system but rather is intended to include all foodstuffs and pet foods having as a common parameter a protein-containing solid in a liquid system.

The principal objects of this invention will be more readily apparent in the concluding portion of this specification.

DESCRIPTION OF THE INVENTION

The method of this invention is practiced by adding effective amounts of an anionic polymer, specifically gum arabic, gum ghatti or a combination of these to the liquid portion of a canned proteinaceous foodstuff in order to inhibit protein extraction and prevent gelation of the small amount of extractable protein that may thereafter be present in the liquid. While it is acknowledged that this invention may be utilized in a wide range of products having in common a liquid and proteinaceous solid phase, reference will henceforth be made to meat and gravy type products in the interests of convenience and clarity.

In preparing canned meat and gravy-type products such as stews, meatballs and gravy, and the like, it is a common procedure to precook the meat portion with other ingredients such as seasoning, minerals etc. and thereafter add the pre-cooked meat to the hydrated gravy mixture in the can whereupon the can is sealed and then heat processed for sterilization. It is during this sterilization procedure that the extraction of the protein from the meat into the gravy takes place.

The purpose of this invention is to prevent gravy gelation due to the presence of extracted protein therein caused by the heating process. This is accomplished by adding to the gravy, gum arabic, gum ghatti or a combination thereof at concentrations of about 0.1 to about 10% where the protein content of the meat is about 15 to about 35%, a gum concentration of about 2 to 5% being preferred for the above-mentioned range of protein. However, the concentration of these anionic gums may be adjusted according to the range of protein in the particular system and the range of 0.1 to 10% is not intended therefor to limit the scope of this invention. It is postulated that these gums when dissolved in the gravy, act to somehow bind the water present in the gravy to the extent that extraction of the protein from the meat is inhibited and hydrogen bonding for the gelation process is prevented. The manner in which the gums are added to the gravy is primarily a matter of effectiveness and expediency so while it is preferable to add the gum directly to the gravy, foreseeably the gums could be dusted on the outer surface of the meat chunks to give the same result since the gums would dissolve in the gravy as soon as the meat chunks were added thereto.

It has further been found that more consistent results are obtained if the gums of this invention are preheated to inactivate any enzymes that might be present in these natural materials. This can be done by heating gum arabic or gum ghatti solutions to temperatures of at least 80°F for a period of time ranging from about 1 to 30 minutes, a temperature of 185°F for 5 to 10 minutes being most preferred. Alternatively, the dry gums can be heat-treated in a similar fashion before being added to the dry gravy mix. The preferred method of this invention therefore is to add the dry gum arabic to the dry sauce mix which is thereafter hydrated, heated to a temperature of about 185°F and kept at that temperature for about 10 minutes before further processing with the meat portion.

It has been found in addition, that when the gums of this invention are to be utilized in a pet food system, gum arabic is particularly preferred because in addition to obviating the problem of gravy gelation, it has been found to beneficially affect the palatability of the overall product, the anionic polymer in the case of pet foods thereby taking on a two-fold significance.

In order that the present invention may be more clearly understood, reference will now be had to the following examples which illustrate representative methods of this invention, and are not intended to be exhaustive of the same.

EXAMPLE I

A typical canned meat and gravy product is a 14 oz. can (net weight) comprising approximately equal proportions (45-55%) of meat and gravy.

About 198.5g of meat and meat by-products are chopped together and appropriate amounts of vitamins, minerals and seasoning are added. The uniform meat mixture is then formed into small stewlike chunks and baked in an oven at about 325°F for 4 minutes.

A dry sauce mix is then prepared by blending starch, cereal solids, seasonings, flavor, salt and gum arabic which is present at a concentration of about 5% by weight of the gravy (3.11 g). Warm water is then added to the dry mix and heated with stirring to about 185°F and maintained at this temperature for about 10 minutes.

The meat chunks are weighed and placed in washed cans with the gravy, sealed and sterilized in a conventional autoclave for about 75 minutes at 250°F.

A sample containing identical amounts of the above-mentioned ingredients with the exception of gum arabic was prepared using the same process.

Both samples were allowed to cool to below 60°F and then opened for examination. The sample containing gum arabic was completely pourable and had the appearance of beef stew. However, the sample without this anionic polymer had completely gelled and could not be poured from the can.

EXAMPLE II

The same method of preparation as in Example I except that an aqueous solution of gum arabic was prepared and maintained at a temperature of 185°F for 10 minutes prior to incorporation into the gravy.

EXAMPLE III

In this experiment, the same method as in Example I was utilized except that a 5% concentration by weight of the gravy of gum ghatti was employed. The same results as demonstrated by gum arabic were obtained.

What is claimed is:

1. A method of preventing gellation during storage in canned proteinaceous products having a liquid and solid proteinaceous phase which comprises adding to the liquid phase an anionic polymer gum selected from the group consisting of gum arabic, gum ghatti, and xanthan gum in an amount effective to inhibit gellation of the liquid phase, canning and sterilizing.

2. The method of claim 1 wherein the gum is present at a concentration of about 1 to about 10% by weight of the liquid phase and wherein the protein content of the solid phase is about 15% to about 35%.

3. The method of claim 2 wherein the gum is present at a concentration of about 2 to about 5%.

4. The method of claim 1 wherein the anionic polymer gum is heat treated prior to use.

5. The method of claim 4 wherein the gum is added in dry form to the liquid phase and the liquid phase containing the gum is maintained at a temperature of at least 80°F from 1-30 minutes prior to sterilization.

6. The method of claim 5 wherein the liquid phase containing the gum is maintained at a temperature of at least 185°F from 5 to 10 minutes.

7. The method of claim 1 wherein the product is a pet food.

8. The method of claim 7 wherein the anionic polymer gum is gum ghatti.

9. The method of claim 6 wherein the anionic polymer is gum ghatti.

10. The method of claim 7 wherein the gum is xanthan gum.

* * * * *